D25-58 AU 291 EX
XR RE 20,985
Jan. 24, 1939. L. A. KNIGHT Re. 20,985
PROCESS OF MAKING ARTIFICIAL STONE WALL FACINGS
Original Filed May 17, 1937
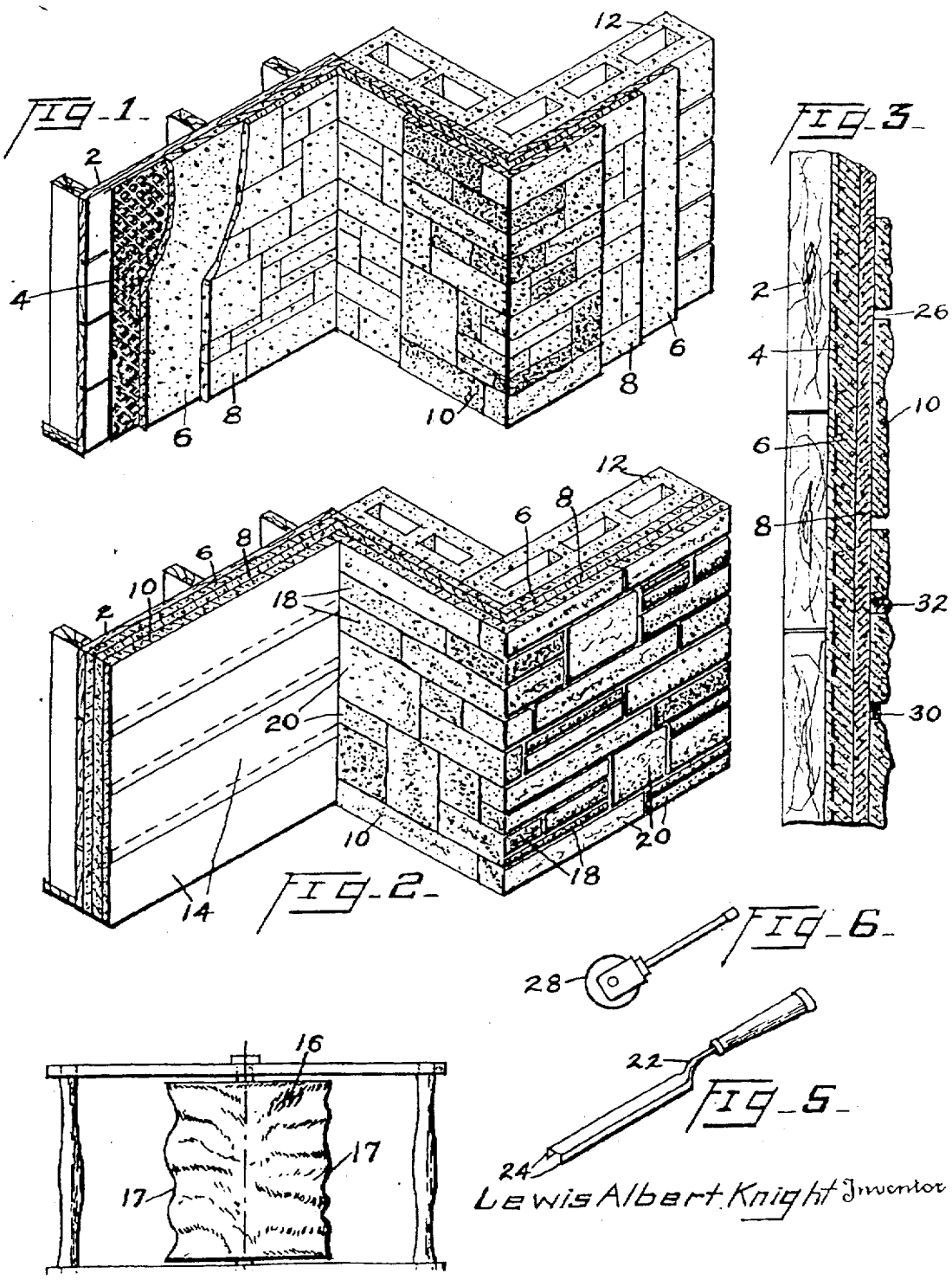

UNITED STATES PATENT OFFICE 20,985

PROCESS OF MAKING ARTIFICIAL STONE WALL FACINGS

Lewis Albert Knight, Owings Mills, Md., assignor to The Lasting Products Co., Baltimore, Md., a corporation of Maryland Original No. 2,095,642, dated October 12, 1937, Serial No. 142,199, May 17, 1937. Application for reissue June 24, 1938, Serial No. 215,893

17 Claims. (Cl. 72—17)

This invention relates to artificial stone wall facings and finishes and process of making same and has particular reference to polychrome wall facings and finishes of this character.

There has been a long felt need in this art for wall facings, adapted for use on base structures of wood, metal, brick, cement, concrete block, cinder block, stone, etc. that will resemble as much as possible the natural stone facings and finishes and also possess to as great or greater extent the durability and wearing qualities of natural stone facings.

Many attempts to solve this problem have heretofore been made but the results have been attended by distinctive disadvantages.

In one of these prior processes, plastic material is applied to a wall from specially designed molds. Each mold is provided with a plunger whereby the material is forced out of the mold and pressed against the wall. The surface of the plunger is corrugated or crinkled to produce the corresponding design on the finished surface. Before filling the mold with the plastic material the face of the plunger is covered with waxed paper to prevent adhesion of the plastic material to the plunger. For each different design and size of stone to be formed on the wall a different mold must be used, thus involving considerable cost and necessitating a large stock of molds to produce the desired variety of artificial stone facings. To provide the proper chromatic effects, pigments of the desired shade and color are sprinkled on the waxed paper within the mold before the plastic material is poured in. This results in an extremely superficial tinting of the facing, which readily wears away or becomes discolored through the action of the atmospheric elements.

A still further disadvantage of this prior process is that when artificial stone facings of large area are to be formed on the walls, the mold and the contents of plastic material assume great weight and the process becomes laborious. Pressure must also be exerted in the application of the material to the walls, thus adding further to the labors of the operation. It has also been found that, in the final construction, contact between the facing and the wall cannot be assured for the entire extent of the wall treated, and there is also much uncertainty as to the location and extent of any contact that is produced. As a consequence, objectionable air pockets of undesirable extent exist in the final structure, resulting in a great weakening of the bond between wall and facing and rendering the wall facing very susceptible to easy destruction through breaking, scaling or chipping.

A still further objection to this process is that it requires specially trained labor to produce a finished piece of work of satisfactory and proper appearance. The tools employed for this process and the mode of operation are entirely foreign to the very simple tools and the mode of operation of masons and cement finishers, which necessitates the training of specially skilled labor. The proper positioning of each of the masses of plastic material forced from the mold onto the wall to effect proper alinement with each other of the individual sections of varying size and shape requires much skill and practice and therefore involves additional items of expense.

Also, the plunger does not readily separate from the mass of plastic material after its application to the wall and it is difficult to prevent disturbance of the plastic material on the wall during such removal of the plunger. Such disturbance results in marring the outward configuration of the facing and also produces checks, cracks and fissures in the plastic material, all of which weaken and mar the final wall facing.

Among the objects of this invention is to provide a wall facing that will be free from the objections heretofore described to the wall facings produced by the particular prior process outlined heretofore, and to provide a process whereby the objections and disadvantages of the prior process heretofore set forth are eliminated.

A further object of this invention is to provide a process for making an artificial stone facing that may be readily carried out by masons and cement finishers and wherein the tools used by masons and cement finishers are utilized.

A still further object of this invention is to provide a process for making an artificial stone facing which can be employed for walls of various design and construction, including rounded structures as well as straight faced walls.

Other, further and more specific objects of this invention will become readily apparent to persons skilled in the art from a consideration of the following description when taken in conjunction with the accompanying drawing wherein:

Figs. 1 and 2 are fragmentary perspective views showing several layers of coating material applied to walls of wood or masonry. In Fig. 1 the facings are shown in unfinished form. In Fig. 2 the facing during three stages of the process is shown.

Fig. 3 is a fragmental cross-section through a wall showing the several layers of plastic material applied to a wall.

Fig. 4 is a side view of a specially designed roller with crinkled surface used in my process.

Fig. 5 is a perspective view of the chasing tool used in my process.

Fig. 6 is a side view of the flat-faced edging roller used in my process.

Upon a wall 2 of wood, a lath 4 of wood or metal and preferably reticulated or perforated is attached to the wall. A layer 6 of plastic material, such as cement mortar, is applied over the lath and the surface of this layer is scored before it sets and dries. The lath 4 serves to re-inforce the layer 6 and aid its adherence to the wall 2. After the layer 6 dries, another layer of plastic material 8 is applied thereon, and promptly score-lined according to the pre-determined position, spacing, configuration and size of the stone desired.

Upon this second layer 8 the outer layer 10 of plastic material is formed by applying mortar cement of the particular color or shade desired upon the respective zones or areas formed by score-lining the surface of the layer 8. The plastic material or mortar cement of the outer layer 10 is preferably of two or more colors and/or shades upon each area or zone, but very satisfactory results may be obtained under certain conditions with mortar of a single distinctive color upon one or more of these zones or areas. The layers of plastic material 6, 8 and 10 are applied with a trowel. The layer 6 is preferably from ⅜ to ¾ inch thick. The layers 8 and 10 are preferably from ¼ to ⅜ inch thick.

Where the base or wall is of masonry no metal or other lath is needed, the first coating 6 being applied directly to the masonry 12, and the other coatings 8 and 10 are applied as heretofore described for wooden bases or walls.

Upon the layer 10 of variously colored mortar cement, while such cement is in the plastic condition, crushed stone or granules, or variously colored powdered materials such as mica, oxide pigments, stone dust, slate dust, chips of mineral or artificial stone, diatomaceous earth, kieselguhr, volcanic scoria, etc., are dashed on by hand or with air pressure to produce the desired speckled surfaces in simulation of special natural rocks or stones.

After application of this comminuted material to the surface 10, and before the cement in the layer 10 has become set, waxed paper 14 or other lamina which does not adhere to the plastic material is spread thereon, after which the roller 16 having the crinkled surface 17 is passed over the waxed paper in the directions desired and with sufficient pressure to produce the crinkled surface on the outer layer or facing 10. After the roller has passed over the waxed paper applied to the plastic coating 10, there will be formed on this coating elevations 18 and depressions 20 corresponding to the part of the roller in contact with the facing during the rolling process and resembling the variegated crinkled surfaces of undressed stone.

The waxed paper is then removed and, while the coating 10 is still in plastic condition, the crinkled surface is scored with the chasing tool 22, substantially following the score-lines previously formed on the layer 8. The chasing tool 22 has two parallel cutting edges 24 and is used to form the grooves or furrows 26 in simultation of the mortar joints in natural stone structures and thereby producing, in the finishing coating 10, blocks of various stone-like sizes. The distance between the cutting edges 24 of the tool 22 is equal to the width of the ordinary mortar joints.

I have found it very satisfactory to have this furrow or groove 26 of a depth approximating the thickness of the finishing coating 10, in which case the outer layer 10 is gouged until the layer 8 is exposed at these grooves.

A flat-faced edging roller 28 is then run in these grooves 26 around the outside edge of each of the fashioned blocks, the roller pressing the edge down to simulate a hammered rock of rough, rugged edge. The grooves 26 may also be formed smooth instead of with a rough, rugged edge.

If desired, the grooves 26 may be filled with mortar 30 of any desired color or shade. This material may be formed with a bead 32, as shown in Fig. 3, or fashioned into any other form.

After the finishing surface has been allowed to take an initial set, it is brushed vigorously with a stiff fibre brush thereby removing cementitious film and exposing the variously colored materials and granules which were blasted upon or otherwise applied to the surface.

The facings produced by my novel process possess a very attractive appearance, effectively simulating that of unfinished or undressed natural stone. Since the mortar cements used for yielding the polychrome effects have the pigment incorporated throughout the masses and since these colored mortar cements are of substantial depth, the color extends a substantial distance below the surface of the facing.

In addition to the variegated crankled surfaces produced on the facing, the roller 16 also blends the cementitious materials of different colors and thereby enhances the appearance of the facings.

The plastic mortar cement may be made of various kinds of cementitious mixtures, such as Portland cement, hydraulic cement, quick or slow setting cements, plaster, etc., with ground or crushed rock and sand.

The roller for producing the crinkled surface on the facing is preferably made of cast aluminum. If desired, several rollers of different contours and/or different sizes may be employed to admit the production of a greater variety of designs on the crankled surface blocks or sections and also to permit operation in corners of walls and other restricted zones. My process is adapted for use on curved and other irregular base structures as well as flat bases or walls, and in this respect possesses a very valuable advance over the prior processes which have been found very difficult to operate on anything other than flat walls.

In an alternative procedure, after forming the crinkled surface on the outer coating 10 and while this coating 10 is in plastic condition, the waxed paper is cut through where the furrows or grooves are to be formed, the coating then gouged to the desired depth to form the furrows or grooves, and the waxed paper later removed from the blocks of artificial stone.

A further modification of this invention is to apply to the facing 10 other substances which react chemically therewith. Such application is preferably made after the crinkling step of the process and when the cementitious material has set and dried. For this purpose, a solution of mangesium fluosilicate or a solution of sodium silicate may be used, thus aiding to set the colors of the facing, counteract or check the tendency of these colors to fade, and enhance the appearance of the facing.

A still further modification of this invention is to apply to the facing 10 fragments of iron, copper, brass or bronze, before the crinkling step of the process. These metals on rusting or corroding by the atmosphere produce unique colorations.

The advantages of my process over the methods heretofore employed are as follows:

1. The need for a large number of molds, heretofore employed to simulate the various surface irregularities of natural undressed stone, is overcome.

2. A much greater area of surfacing can be accomplished with a given amount of labor in a given amount of time.

3. A firmer and better bond between the several coatings and particularly between the second coating and the outer coating is obtained with the troweling operations of my process than in the prior process where there is either poor contact or no contact at all over extensive areas between the outer facing and its support.

4. By my process there is assured a sufficient depth of colored material so that it will withstand, for long periods of time, erosion and other wear of the atmospheric elements without losing its characteristic colorations and appearance.

5. With my process there is no need for using pressure when applying the outer surface. Merely smearing the plastic material with a trowel has been found satisfactory and there is formed a surface that is continuous and free from cracks, breaks and other undesirable voids incident to prior constructions of this type.

The present invention is not limited to the specific details set forth in the foregoing examples which should be construed as illustrative and not by way of limitation, and in view of the numerous modifications which may be effected therein without departing from the spirit and scope of this invention it is desired that only such limitations be imposed as are indicated in the appended claims.

I claim as my invention:

1. In a process of making an artificial stone facing, applying to a supporting base a layer of cementitious material in plastic form, marking the surface of said layer into zones in simulation of individual stones in facings of natural stone, then applying upon said layer colored cementitious material in plastic form at said zones, covering said colored cementitious material with a lamina of material to which the plastic material does not adhere, passing a tool over said lamina and producing in the outer plastic cementitious materials elevations and depressions resembling those of undressed stone, removing the non-adhering lamina, and then forming in said outer plastic cementitious material furrows or grooves of design and configuration substantially in alinement with the prior markings on the surface of said first layer of cementitious material and in simulation of mortar joints on the surfaces of stone structures.

2. In a process of making an artificial stone facing, applying to a supporting base a layer of cementitious material in plastic form, marking the surface of said layer into zones in simulation of individual stones in facings of natural stone, then applying upon said layer other cementitious material in plastic form and of a plurality of colors at said zones, dashing colored, comminuted material upon the outer plastic material, covering the latter with thin waterproof paper, passing a roller with a crinkled surface over said paper and producing in the outer plastic cementitious materials elevations and depressions resembling those of undressed stone, removing the waterproof paper, and then forming in said outer plastic cementitious material furrows or grooves of design and configuration substantially in alinement with the prior markings on the surface of said first layer of cementitious material and in simulation of mortar joints on the surfaces of stone structures.

3. In a process of making an artificial stone facing, applying to a supporting base a layer of cementitious material in plastic form, score-lining the surface of said layer into zones in simulation of individual stones in facings of natural stone, then troweling said layer with colored cementitious material in plastic form at said zones, covering said colored cementitious material with a lamina of material to which the plastic material does not adhere, passing a roller with a crinkled surface over said lamina and producing in the outer plastic cementitious materials elevations and depressions resembling those of undressed stone, removing the non-adhering lamina, and then forming in said outer plastic cementitious material furrows or grooves of design and configuration substantially in alinement with the prior score-linings on the surface of said first layer of cementitious material and in simulation of mortar joints on the surfaces of stone structures.

4. In a process of making an artificial stone facing, applying to a supporting base a layer of cementitious material in plastic form, scoring the surface of said cementitious material and allowing same to set and dry, applying thereon another layer of cementitious material in plastic form, marking the surface of the second layer into zones in simulation of individual stones in facings of natural stone, then applying upon said second layer colored cementitious material in plastic form at said zones, covering said colored cementitious material with a lamina of material to which the plastic material does not adhere, passing a tool over said lamina and producing in the outer plastic cementitious materials elevations and depressions resembling those of undressed stone, removing the non-adhering lamina, and then forming in said outer plastic cementitious material furrows or grooves of design and configuration substantially in alinement with the prior markings on the surface of the second layer of cementitious material and in simulation of mortar joints on the surfaces of stone structures.

5. In a process of making an artificial stone facing, applying to a supporting base a layer of cementitious material in plastic form, marking the surface of said layer into zones in simulation of individual stones in facings of natural stone, then applying upon said layer colored cementitious material in plastic form at said zones, dashing upon the outer plastic material colored comminuted material including particles of metal corrodible in the atmosphere, covering the outer plastic material with a lamina of material to which the plastic material does not adhere, passing a tool over said lamina and producing in the outer plastic cementitious materials elevations and depressions resembling those of undressed stone, removing the non-adhering lamina, and then forming in said outer plastic cementitious materials furrows or grooves of design and configuration substantially in alinment with the prior markings on the surface of said first layer of cementitious material and in simulation of mortar joints on the surfaces of stone structures.

6. In a process of making an artificial stone facing, applying to a supporting base a layer of cementitious material in plastic form, marking the surface of said layer into zones in simulation of individual stones in facings of natural stone, then applying upon said layer colored cementitious material in plastic form at said zones, then applying other material which reacts chemically with the outer cementitious plastic material and is effective in setting the color thereof, covering the latter with a lamina of material to which the plastic material does not adhere, passing a tool over said lamina and producing in the outer plastic cementitious materials elevations and depressions resembling those of undressed stone, removing the non-adhering lamina, and then forming in said outer plastic cementitious materials furrows or grooves of design and configuration substantially in alinement with the prior markings on the surface of said first layer of cementitious material and in simulation of mortar joints on the surfaces of stone structures.

7. In a process of making an artificial stone facing, applying to a supporting base a layer of cementitious material in plastic form, marking the surface of said layer into zones in simulation of individual stones in facings of natural stone, then applying upon said layer colored cementitious material in plastic form at said zones, covering said colored cementitious material with a lamina of material to which the plastic material does not adhere, passing a tool over said lamina and producing in the outer plastic cementitious materials elevations and depressions resembling those of undressed stone, removing the non-adhering lamina, and then forming in said outer plastic cementitious material furrows or grooves in simulation of mortar joints on the surfaces of stone structures.

8. In a process of making an artificial stone facing, applying to a supporting base a layer of cementitious material in plastic form, marking the surface of said layer into zones in simulation of individual stones in facings of natural stone, then applying upon said layer other cementitious material in plastic form and of a plurality of colors at said zones, covering said colored cementitious material with thin waterproof paper, passing a roller with a crinkled surface over said paper and producing in the outer plastic cementitious materials elevations and depressions resembling those of undressed stone, removing the waterproof paper, and then forming in said outer plastic cementitious material furrows or grooves of design and configuration in simulation of motar joints on the surfaces of stone structures.

9. In a process of making an artificial stone facing, applying to a supporting base a layer of cementitious material in plastic form, marking the surface of said layer into zones in simulation of individual stones in facings of natural stone, then applying upon said layer colored cementitious material in plastic form at said zones, covering said colored cementitious material with a lamina of material to which the plastic material does not adhere, passing a tool over said lamina and producing in the outer plastic cementitious materials elevations and depressions resembling those of undressed stone, forming in said outer plastic cementitious material furrows or grooves in simulation of mortar joints on the surfaces of stone structures and removing the non-adhering lamina.

10. In a process of making an artificial stone facing, applying to a supporting base a layer of cementitious material in plastic form, then applying upon said layer colored cementitious material in plastic form at pre-determined zones, covering said colored cementitious material with thin waterproof paper, passing a roller with a crinkled surface over said paper and producing in the outer plastic cementitious materials elevations and depressions resembling those of undressed stone, removing the waterproof paper, and then forming in said outer plastic cementitious materials furrows or grooves of design and configuration substantially in alinement with the boundaries of the pre-determined zones on the surface of said first layer of cementitious material and in simulation of mortar joints on the surfaces of stone structures.

11. In a process of making an artificial stone facing, applying to a supporting base a layer of cementitious material in plastic form, then applying upon said layer colored cementitious material in plastic form at pre-determined zones, covering said colored cementitious material with a lamina of material to which the plastic material does not adhere, passing a tool over said lamina and producing in the outer plastic cementitious materials elevations and depressions resembling those of undressed stone, removing the non-adhering lamina, and then forming in said outer plastic cementitious material furrows or grooves in simulation of mortar joints on the surfaces of stone structures.

12. In a process of making an artificial stone facing, applying to a supporting base layer of cementitious material in plastic form, then applying upon said layer colored cementitious material in plastic form at pre-determined zones, producing in the outer cementitious materials while in plastic condition and before setting elevations and depressions resembling those of undressed stone, and then forming in said outer plastic cementitious material furrows or grooves in simulation of mortar joints on the surfaces of stone structures.

13. In a process of making an artificial stone facing, applying to a supporting base layer of cementitious material in plastic form, then applying upon said layer colored cementitious material in plastic form at pre-determined zones, dashing colored, comminuted material upon the outer plastic material, producing in the outer cementitious materials while in plastic condition and before setting elevations and depressions resembling those of undressed stone, and then forming in said outer plastic cementitious material furrows or grooves in simulation of mortar joints on the surfaces of stone structures.

14. In a process of making an artificial stone facing, applying to a supporting base a layer of cementitious material in plastic form, then applying upon said layer colored cementitious material in plastic form at pre-determined zones, producing in the outer cementitious materials while in plastic condition and before setting elevations and depressions resembling those of undressed stone and plending said cementitious materials by pressure, and then forming in said outer plastic cementitious material furrows or grooves in simulation of mortar joints on the surfaces of stone structures.

15. In a process of making an artificial stone facing, applying to a supporting base layer of cementitious material in plastic form, then troweling said layer with colored cementitious material in plastic form at predetermined zones, dashing colored, comminuted material upon the outer plastic material, producing in the outer cementitious materials while in plastic condition and before setting elevations and depressions resembling those of undressed stone and blending said cementitious materials by pressure, and then forming in said outer plastic cementitious material furrows or grooves in simulation of mortar joints on the surfaces of stone structures.

16. In a process of making an artificial stone facing, applying to a supporting base layer of of cementitious material in plastic form, then troweling said layer with colored cementitious material in plastic form at predetermined zones, covering said colored cementitious material with a lamina of material to which the plastic material does not adhere, producing in the outer plastic cementitious materials elevations and depressions resembling those of undressed stone and blending said cementitious materials by pressure, removing the non-adhering lamina, and then forming in said outer plastic cementitious material furrows or grooves in simulation of mortar joints on the surfaces of stone structures.

17. In a process of making an artificial stone facing, applying to a supporting base a layer of cementitious material in plastic form, then troweling said layer with colored cementitious material in plastic form at predetermined zones, covering said colored cementitious material with a lamina of material to which the plastic material does not adhere, producing in the outer plastic cementitious materials elevations and depressions resembling those of undressed stone and blending said cementitious materials by pressure, forming in said outer plastic cementitious material furrows or grooves in simulation of mortar joints on the surfaces of stone structures, and then removing the non-adhering lamina.

LEWIS ALBERT KNIGHT.